March 15, 1932.   F. A. PEARSON   1,849,882
GEAR SHIFTING MECHANISM
Filed Aug. 7, 1929   2 Sheets-Sheet 1
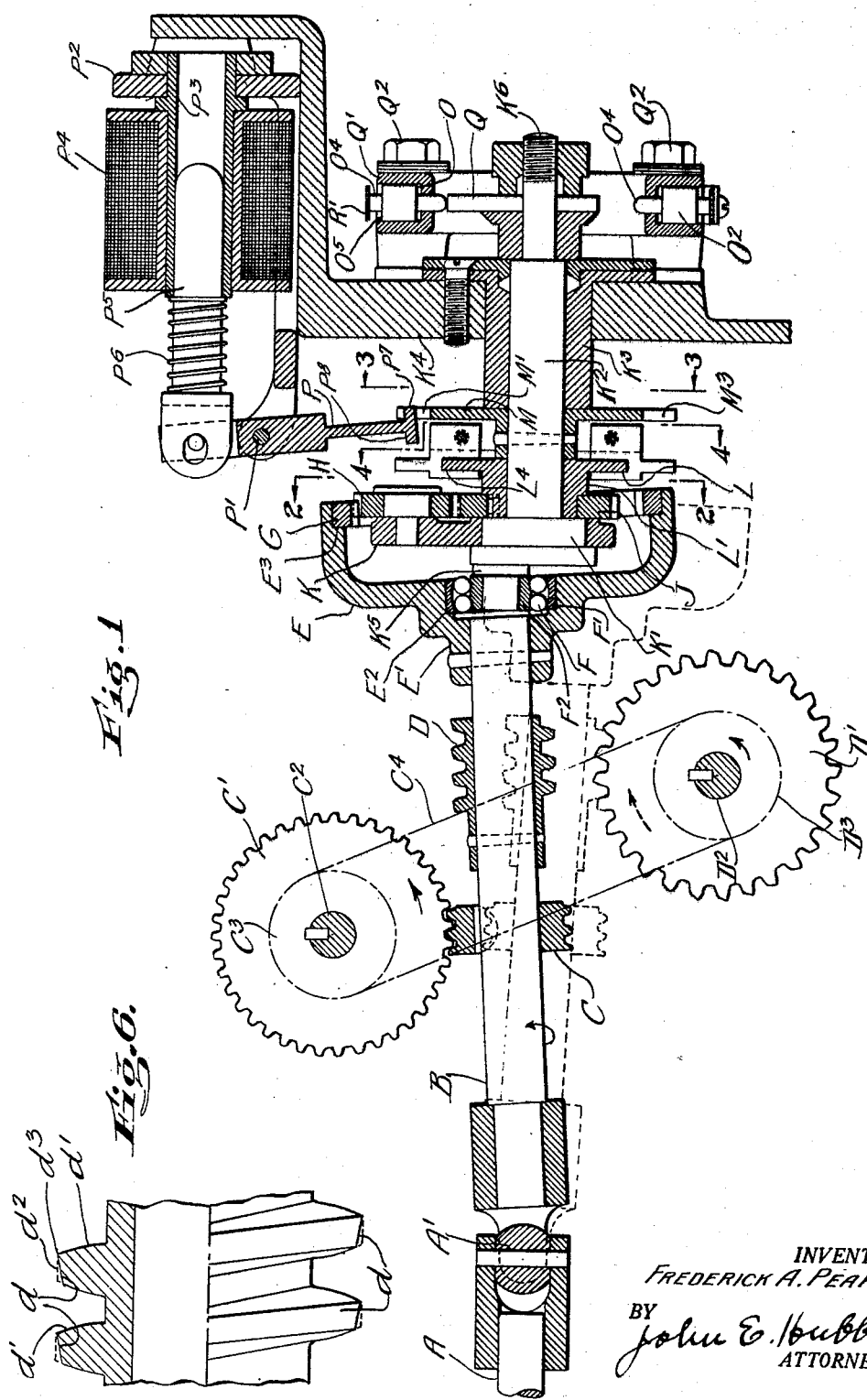
INVENTOR.
FREDERICK A. PEARSON
BY John E. Hubbell
ATTORNEY

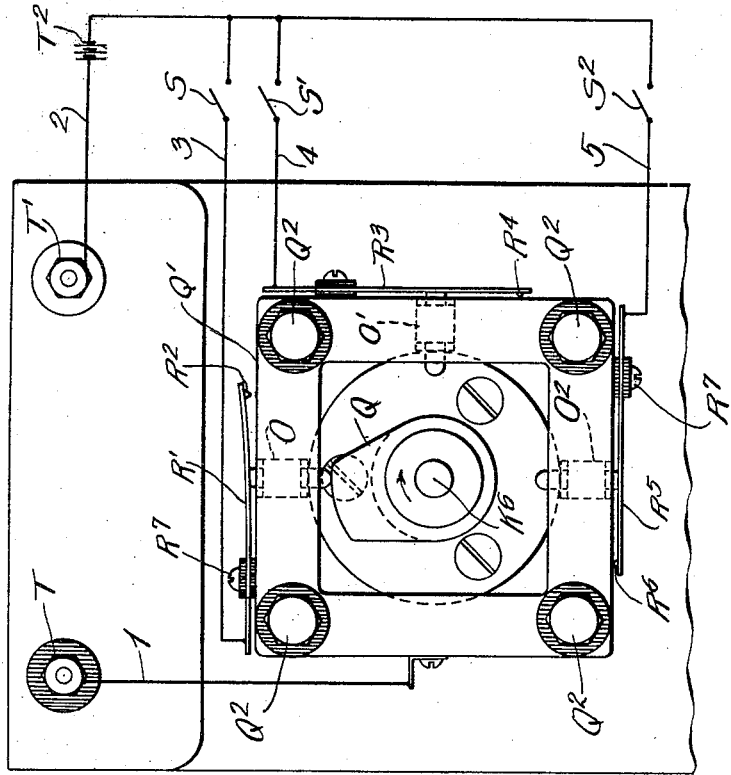
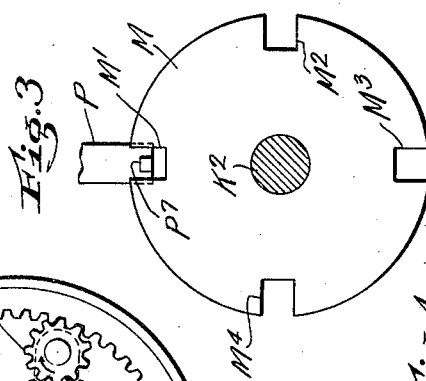
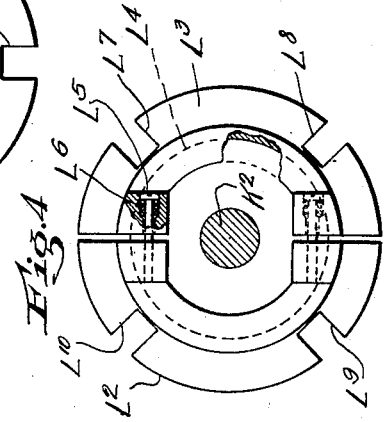
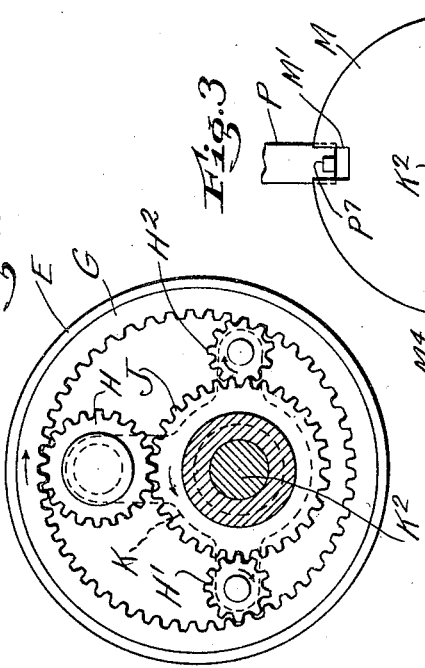

Patented Mar. 15, 1932

1,849,882

UNITED STATES PATENT OFFICE

FREDERICK A. PEARSON, OF GREAT BARRINGTON, MASSACHUSETTS

GEAR SHIFTING MECHANISM

Application filed August 7, 1929. Serial No. 384,033.

The present invention relates in general to power transmission systems and particularly to transmission systems including a shifting mechanism having provisions for selectively engaging a driving element with one of a plurality of driven elements normally out of engagement with but adapted to be operatively connected thereto. The general object of my invention is to provide an improved construction and mode of operation of a shifting mechanism characterized by the simplicity and effectiveness of the provisions for controlling the operation of the shifting mechanism and by means for facilitating the engagement of the driving and driven elements.

While certain features of my invention are adapted for use in various types of power transmission and control systems, the apparatus of my invention is especially useful when incorporated in transmission apparatus of the character illustrated in my prior application Serial No. 321,053, filed November 22, 1928, and will be described in connection with a system of that general type.

The various features of novelty which characterize my invention are pointed out with particularity in the claims annexed to and forming a part of this specification. For a better understanding of the invention, however, and the advantages possessed by it reference should be had to the accompanying drawings and descriptive matter in which I have illustrated and described a preferred embodiment of the invention.

Of the drawings:

Fig. 1 is a sectional elevation of one embodiment of my invention with certain parts diagrammatically illustrated;

Figs. 2 and 3 are vertical sections on the line 2—2 and 3—3, respectively, of Fig. 1;

Fig. 4 is a section on the line 4—4 of Fig. 1 with parts broken away;

Fig. 5 is an end view of the control mechanism illustrated in Fig. 1; and

Fig. 6 is an enlarged elevation partly in section of a portion of the worm illustrated in Fig. 1.

In the drawings I have illustrated a preferred form of my invention as incorporated in a speed changing and reversing power transmission system of the general character illustrated in my said prior application. In the system shown, A indicates a power shaft, adapted to be driven from a suitable power source and connected by a suitable universal joint A' to the adjacent end of a driving shaft B. The latter is provided at longitudinally spaced points with a helical gear C and a worm D, respectively adapted to be engaged to a helical gear C' and worm gear D'. The gears C' and D' are mounted on shafts $C^2$ and $D^2$, respectively, at opposite sides of and extending normally to the orbital axis of the drive shaft B. The shafts $C^2$ and $D^2$ and their respective gears are spaced a predetermined distance from a neutral position of the drive shaft and may be separately connected to a work performing mechanism (not shown) or preferably as shown, interconnected by sprocket wheels $C^3$ and $D^3$ and an endless chain $C^4$. The drive shaft is arranged to be shifted from a neutral idling position to the extreme upper and lower engaging positions indicated by the full and broken lines, respectively, in Fig. 1 and can be moved directly from one extreme position to the other as hereinafter described.

The mechanism by means of which the position of the drive shaft is shifted comprises a cup shaped casing E having a hub portion E' secured to the free end of the drive shaft B. The portion of the casing hub adjacent the end of the drive shaft has a recess $E^2$ in which the outer race F' of a ball bearing F is mounted. The enlarged outer end of the casing is formed with an inner peripheral recess $E^3$ in which is secured an internal gear G forming a part of a planetary gear system.

As illustrated in Figs. 1 and 2, the planetary system comprises the internal gear G, a plurality of angularly spaced pinion gears H, H' and $H^2$, and a sun pinion gear J. The gears H, H', and $H^2$ are rotatably supported on radial extensions of an arm K, which is secured on the circumference of a crank disc K'. The disc K' forms an integral end portion of a normally stationary crank shaft $K^2$ extending rearwardly therefrom. The shaft $K^2$ is rotatably mounted in a bearing $K^3$ positioned in a housing wall $K^4$ and with its axis of rotation out of longitudinal alignment with the axis of the drive shaft in any normal position of the latter. A crank pin $K^5$ projects from the disc $K'$ towards and into the recess $E^2$, the inner race $F^2$ of the bearing F being mounted thereon. The sun pinion J is secured on the hub $L'$ of a clutch disc L, which is freely rotatable on the shaft $K^2$ at the rear of the crank disc. As illustrated in Fig. 2, the pinion H is of greater pitch diameter than the pinions $H'$ and $H^2$, which are shown as of equal pitch diameter. With the above arrangement it will be noted that rotation of the shaft $K^2$ will effect an eccentric movement of the arm K, casing E, and drive shaft B about the axis of the shaft $K^2$.

The source of power for the rotation of shaft $K^2$ is the drive shaft B, effected through the planetary system illustrated. Obviously, if the arm K is fixed in position and the internal gear G rotated, then the sun pinion J will freely revolve on the shaft $K^2$ and the drive shaft will be maintained in the same position. When, however, the sun pinion is held stationary and the internal gear rotated, the arm K and shaft $K^2$ will be moved about the axis of the shaft $K^2$. This rotative movement through the crank pin $K^5$ effects an eccentric movement of the internal gear and drive shaft. When the latter is initially engaged with the shaft $C^2$, as shown, an eccentric movement through 180° will disengage the shaft B and $C^2$ and operatively engage the shafts B and $D^2$. The eccentric movement will continue returning the shaft B towards its initial position unless provisions are made for quickly releasing the sun pinion and engaging the arm K at the second engaging position.

By the present invention, mechanism is provided for controlling the shifting movement. In the embodiment illustrated, a disc M is secured to the shaft $K^2$ adjacent to the clutch disc L. The disc M is provided with peripheral notches $M'$, $M^2$, $M^3$, $M^4$ angularly spaced 90° from one another and adapted to be intercepted by a trip lever P.

The clutch disc L, which is rotatable on the shaft $K^2$, is surrounded by a clutch consisting of two semi-circular members $L^2$ and $L^3$. The circumferential portion of the clutch disc is arranged to fit within a slot $L^4$ at the inner side of each of the clutch members and the latter are held in friction contact with the clutch disc and connected to one another by bolts $L^5$ and compression springs $L^6$ as shown in Fig. 4. The peripheral portions of the clutch members are formed with notches $L^7$, $L^8$, $L^9$ and $L^{10}$ and also adapted to be intercepted by the lever P. This lever is pivotally mounted at $P'$ on a solenoid supporting frame $P^2$. A supporting tube $P^3$ extends from the frame $P^2$ to carry a solenoid coil $P^4$ of a well known form. A magnetic armature or core $P^5$ is positioned in the tube $P^3$ and arranged to be drawn axially therein when the solenoid $P^4$ is energized. The armature $P^5$ has a slotted connection at its outer end to the upper end of the trip lever P to effect a pivotal movement of the latter between a position in which a lever finger $P^7$ can intercept the disc M and a second position in which a lever finger $P^8$ can intercept one of the clutch members $L^2$ or $L^3$. The armature is normally held in the position illustrated in Fig. 1 by the action of a compression spring $P^6$ arranged on the armature between the enlarged outer end thereof and the end of the tube $P^3$.

With the foregoing parts constructed and arranged as described and the drive shaft B rotating in the direction indicated by the arrow in Fig. 1 and the helical gear C in engagement with the gear $C'$, the sun pinion J of the planetary system and the clutch mechanism described rotate freely on the shaft $K^2$ provided the trip lever P is in the position shown in Fig. 1. In that position, the finger $P^7$ is positionel within the notch $M'$ to hold the disc M and shaft $K^2$ fixed in position. When it is desired to shift the drive shaft to its lower position in which the worm D and worm gear $D'$ engage, the solenoid coil $P^4$ is energized by means hereinafter described and the armature $P^5$ moves axially therein. By this movement the trip lever is withdrawn from engagement with the disc M and pivotally moved so that the finger $P^8$ intercepts an adjacent notch in the clutch. When this has taken place, the sun pinion J becomes fixed in position and the disc M, shaft $K^2$, and arm K are free to rotate about the axis of the shaft $K^2$. The rotation of the arm K and pinion gears carried thereby causes an eccentric movement of the rotating internal gear G about the axis of the shaft $K^2$. When this movement extends through 180° the drive shaft B is in a position in which the worm and worm gear are engaged and the shaft $D^2$ is then rotated in the direction indicated by the broken arrow in Fig. 1. When this position has been reached, the solenoid must be deenergized immediately to prevent further eccentric movement of the gear G. The deenergizaton of the solenoid permits the armature $P^5$ to move outwardly out of the action of the spring $P^6$ and the resulting pivotal movement of the trip lever brings the latter into a position in which it intercepts the notch $M^3$ which has been displaced 180° from the position shown in Fig. 1. The arm K being again fixed in position, the clutch and sun gear are free to rotate on the shaft $K^2$ until the next shifting movement takes place.

During the action described in which the worm and worm gear are relatively moved into an engaging position, it often happens that the relative position of the parts is such that the gear teeth will not properly mesh. When the worm and worm gear are formed with teeth of standard form and so positioned that the tooth outer faces are brought into abutting contact by the shifting movement, it will be obvious that if further relative movement occurs in the same direction, distortion of the parts will occur unless suitable provisions are made for temporarily restricting or rendering ineffective the force bringing the gears into contact. The specific clutch mechanism heretofore described is provided for this purpose and the clutch construction permits slippage between the clutch disc and clutch until the worm thread advances sufficiently to be in the proper meshing position.

In lieu of, but preferably in addition to, the clutch mechanism described, each of the engaging gears are provided with teeth of modified standard form to aid in the proper meshing of the gears. Each of the threads and teeth of the engaging gears have their outer face $d$ inclined towards the working face $d'$ of the gear. As shown in Fig. 6, the line of intersection or the "working edge" $d^3$ between the working face $d'$ of the worm thread and its original outer face $d^2$ is determined and the thread is then milled to a plane intersecting the working edge and at an angle of 10 to 20° with the original outer face $d^2$. The teeth of the gears C, C' and D' are similarly formed. The resulting faces $d$ when brought into contact slide relatively to one another and the eccentric movement of the worm continuing causes the worm gear to move rearwardly, thereby permitting the worm thread to slide into its proper engaging position.

The present invention also comprises automatically operating means for controlling the shifting movement described. As shown particularly in Figs. 1 and 5, the shaft $K^2$ is provided with a narrowed extension $K^6$ on which a cam Q is secured. Surrounding the cam is a rectangular channel frame Q' supported from the housing $K^4$ by insulated bolts $Q^2$. Three sides of the frame are provided with lifting members O, O' and $O^2$, respectively, each formed of insulating material and consisting of a pin O' having a collar $O^5$ thereon which is slidably mounted in the frame Q' at points equi-spaced from the axis of the shaft $K^6$. The upper end of each pin is arranged to contact with the underside of a corresponding flat spring R', $R^3$ or $R^5$ having an insulated post connection $R^7$ with the frame adjacent one end. The opposite end of the spring R' carries a contact point $R^2$ at its underside which is normally contacting with the frame. In the construction shown the lifting members O, O' and $O^2$ are angularly spaced 90° from one another and correspond to the upper, neutral and lower positions of the drive shaft. The springs $R^3$ and $R^5$ are similarly provided with contact points $R^4$ and $R^6$, respectively. The fourth side of the frame Q' is connected by a conductor 1 to a terminal post T mounted on and insulated from the housing $K^4$. A similar terminal post T' is provided with a conductor 2 in which a source of electrical energy $T^2$ is positioned and which is connected by branch conductors 3, 4 and 5 to the springs R', $R^3$ and $R^5$, respectively. Operating switches S, S' and $S^2$ are positioned in the conductors 3, 4 and 5, respectively. The terminal posts T and T' are connected to opposite ends of the solenoid coil $P^4$, whereby the latter will be energized when any one of the frame circuits are closed.

With the control provisions arranged as described and a shifting of the drive shaft from the position shown in Fig. 1 to its lower position desired, the cam Q will be in the position indicated in Fig. 5; the switch $S^2$ is then closed to establish an electrical circuit through the conductor 1, frame Q', contact point $R^6$, spring $R^5$, conductor 5, and conductor 2, thereby energizing the solenoid $P^4$ to operate the trip lever. The shaft $K^2$ and cam Q is thereby rotated from its upper position through an angle of 180° on which point the lifting member $O^2$ is raised by the cam, thereby raising the contact point $R^6$, breaking the energizing circuit, deenergizing the solenoid, and restoring the trip lever into engagement with the disc M. With this arrangement the solenoid is energized only during the period of shifting the drive shaft and its circuit is automatically interrupted when the drive shaft reaches the desired position.

While in accordance with the provisions of the statutes, I have illustrated and described the best form of embodiment of my invention now know to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention what I claim as new and desire to secure by Letters Patent, is:—

1. In apparatus of the character described, a rotatable driving element, a rotatable driven element adapted to be operatively connected to said driving element, and means for moving one of said elements through an eccentric orbit to effect said connection, said last mentioned means comprising provisions for interrupting said connecting movement until said elements are relatively arranged in a predetermined manner.

2. In apparatus of the character described, a rotating driving element, a rotatable driven element adapted to be operatively connected to said driving element, and means for moving one of said elements through an eccentric orbit to effect said connection, said last mentioned means comprising a plurality of parts having a friction connection, whereby relative movement between said parts effects a temporary interruption of said connecting movement until said elements are relatively arranged in a predetermined manner.

3. In apparatus of the character described, a rotatable gear element, a second rotatable gear element adapted to be operatively connected to said first element, and planetary gear means for moving said first mentioned gear element eccentrically to effect said connection, said last mentioned means comprising friction clutch provisions for momentarily interrupting said connecting movement until said gear elements are in a proper position to mesh.

4. In apparatus of the character described, a normally rotating driving shaft, a plurality of rotatable driven shafts adapted to be alternately connected to said driving shaft, and means for moving said driving shaft into operative engagement with one of said driven shafts spaced therefrom, said means comprising a planetary gear system, the internal gear of said system being secured on said driving shaft, a sun gear freely rotatable about an axis off-set from said driving shaft, a plurality of pinion gears in operative engagement with said internal gear and sun gear, and friction means for holding said sun gear fixed in position to effect an eccentrical movement of said internal gear about said sun gear on continued rotation of said driving shaft, said friction connection being rendered ineffective by excessive strain during said connecting movement.

5. Apparatus of the character described, a rotating driving element, a rotatable driven element normally out of engagement with and adapted to be connected to said driving element, means for connecting said driving element and said driven element, said means comprising a planetary gear system, one of the elements of said system being movable eccentrically relative to a second element of said system to effect said connection, and means for decreasing the stresses between said driving and driven elements on said connection.

6. In apparatus of the character described, a rotatable driving element, a rotatable driven element adapted to be operatively connected to said driving element, means for moving one of said elements through an eccentric orbit to effect said connection, and means for automatically interrupting said movement when said elements are connected.

7. In apparatus of the character described, a rotatable driving element, a rotatable driven element normally spaced from and adapted to be connected to said driving element, electro-magnetically controlled means for moving one of said elements eccentrically to effect said connection, and means for automatically rendering said electro-magnetic means inoperative after a predetermined eccentric movement of said element.

8. In apparatus of the character described, a rotatable driving element, a rotatable driven element normally spaced from and adapted to be connected to said driving element, means utilizing the power of said driving element for moving the latter eccentrically to effect said connection, said means comprising a shaft eccentrically mounted relative to said driving element, and means for normally holding said shaft fixed in position to prevent said driving element moving eccentrically relative thereto, and electro-magnetic means for releasing said shaft to effect said movement, and means for automatically rendering said electro-magnetic means inoperative after a predetermined movement of said shaft.

9. In apparatus of the character described, a rotatable driving element, a rotatable driven element normally spaced from and adapted to be connected to said driving element, electro-magnetic means causing one of said elements to be moved eccentrically to effect said connection, and means for controlling the operation of said electromagnetic means comprising a cam moving in accordance with the eccentric movement of said element, a conducting frame surrounding said cam, spring contacts mounted at angularly spaced points on said frame and normally in contact therewith, lifting pins mounted in said frame adjacent said contacts and arranged to be actuated by said cam, conductors connecting said frame and contacts with said electromagnetic means, whereby said cam and lifting pins co-act to render said electromagnetic means inoperative at predetermined points in the path of rotation of said cam.

10. In apparatus of the character described, a normally rotating driving shaft, a rotatable driven shaft normally out of engagement with said driving shaft and adapted to be operatively connected thereto, a planetary gear mechanism operatively connected to and having an element mounted on said driving shaft, means for effecting an eccentric movement of said element to operatively connect said shafts, and friction clutch provisions operatively associated with said means and said planetary gear mechanism and operable to interrupt said eccentric movement while said shafts are in a predetermined relative position.

11. In apparatus of the character described, a normally rotating driving shaft, a rotatable driven shaft normally out of engagement with said driving shaft and adapted to be operatively connected thereto, a planetary gear mechanism operatively connected to and having an element mounted on said driving shaft, means for effecting an eccentric movement of said element to operatively connect said shafts, and means operated by said eccentric movement for automatically interrupting said movement when said shafts are operatively connected.

Signed at Great Barrington, in the county of Berkshire and State of Massachusetts, this 3rd day of August, A. D. 1929.

FREDERICK A. PEARSON.